US009900813B2

United States Patent
Beppler et al.

(10) Patent No.: US 9,900,813 B2
(45) Date of Patent: *Feb. 20, 2018

(54) NON-PERSISTENT HETEROGENEOUS NEIGHBORS

(71) Applicant: AT&T Mobility II LLC, Atlanta, GA (US)

(72) Inventors: David Beppler, Duluth, GA (US); Arthur Richard Brisebois, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,372

(22) Filed: May 9, 2016

(65) Prior Publication Data

US 2016/0255553 A1 Sep. 1, 2016

Related U.S. Application Data

(63) Continuation of application No. 14/072,682, filed on Nov. 5, 2013, now Pat. No. 9,363,723.

(51) Int. Cl.
*H04W 36/04* (2009.01)
*H04W 16/32* (2009.01)
(Continued)

(52) U.S. Cl.
CPC .......... *H04W 36/04* (2013.01); *H04W 16/32* (2013.01); *H04W 24/08* (2013.01); *H04W 36/0055* (2013.01); *H04W 36/0083* (2013.01)

(58) Field of Classification Search
CPC . H04W 36/0083; H04W 36/30; H04W 16/32; H04W 24/08; H04W 36/0055; H04W 36/04
(Continued)

(56) References Cited

U.S. PATENT DOCUMENTS 5,974,320 A 10/1999 Ward et al.
6,564,058 B1 5/2003 Flewitt et al.
(Continued)

FOREIGN PATENT DOCUMENTS

GB 2480432 A 11/2011

OTHER PUBLICATIONS

Jeong, et al., "A Smart Handover Decision Algorithm Using Location Prediction for Hierarchical Macro/Femto-Cell Networks", IEEE Vehicular Technology Conference, Sep. 5-8, 2011. 5 pages.
(Continued)

*Primary Examiner* — Charles Appiah
*Assistant Examiner* — Margaret G Mastrodonato
(74) *Attorney, Agent, or Firm* — Amin, Turocy & Watson, LLP

(57) ABSTRACT

A heterogeneous network comprising macro network devices and micro network devices operates to maintain a dynamic data set of neighbor relations for a potential transfer of a User Equipment (UE) device from one network zone to another network zone. In response to detecting a failure of a macro network device to establish a network connection with a network device, a dynamic management of the data set initiates. A capacity number of network connections is determined for the macro network device (e.g., macro eNB sector carrier) based on the data set of neighbor relations. A threshold number is determined from the network neighbor device data, representing the set of micro network devices with which the macro network device is operable to establish the network. A defined number of micro network devices is maintained that is less than the threshold number of the network neighbor device data.

20 Claims, 11 Drawing Sheets

(51) Int. Cl.
*H04W 24/08* (2009.01)
*H04W 36/00* (2009.01)

(58) Field of Classification Search
USPC .................................. 455/422, 437, 444
See application file for complete search history.

(56) References Cited

U.S. PATENT DOCUMENTS

| | | |
|---|---|---|
| 8,027,681 B2 | 9/2011 | Burgess et al. |
| 8,107,964 B2 | 1/2012 | Nylander |
| 8,326,304 B2 | 12/2012 | Kim et al. |
| 8,565,750 B2 | 10/2013 | Fischer |
| 2010/0197298 A1 | 8/2010 | So et al. |
| 2010/0291929 A1 | 11/2010 | Stephens et al. |
| 2010/0291934 A1 | 11/2010 | Lopes |
| 2011/0039520 A1 | 2/2011 | Maida et al. |
| 2011/0201339 A1 | 8/2011 | Kuningas |
| 2011/0207456 A1 | 8/2011 | Radulescu et al. |
| 2011/0237258 A1 | 9/2011 | Nylander et al. |
| 2011/0287756 A1 | 11/2011 | Cho et al. |
| 2011/0310791 A1 | 12/2011 | Prakash et al. |
| 2011/0312358 A1 | 12/2011 | Barbieri |
| 2013/0143541 A1 | 6/2013 | Henderson |
| 2013/0157651 A1 | 6/2013 | Khailan |

OTHER PUBLICATIONS

Niokia Siemens Networks Corporation. "Designing, Operating and Optimizing Unified Heterogeneous Networks", 2011. Published online at [http://nsn.com/system/files/documentlhetnet_wp.pdf], retrieved on Aug. 14, 2013. 16 pages.

Office Action dated Jul. 6, 2015 for U.S. Appl. No. 14/072,682, 17 pages.

NON-PERSISTENT HETEROGENEOUS NEIGHBORS

CROSS REFERENCE TO RELATED APPLICATIONS

This application is a continuation of, and claims priority to, U.S. patent application Ser. No. 14/072,682 (now U.S. Pat. No. 9,363,723), filed on Nov. 5, 2013, entitled "NON-PERSISTENT HETEROGENEOUS NEIGHBORS." The entirety of the foregoing listed application is hereby incorporated by reference herein

TECHNICAL FIELD

The subject disclosure relates to wireless communications and, in particular, to heterogeneous network neighbors of wireless communication networks.

BACKGROUND

Conventional macro network platforms that provide service to mobile devices (e.g., user equipment (UE)) contend with mobility of the UE when providing communication services. Networks (e.g., long term evolution (LTE) technologies) utilize an automatic neighbor relations (ANR) feature to establish neighbor relations between nodes of the network (e.g., eNodeBs) based on measurement reports from UEs in the operator network. Traditional ANR mechanisms are designed for single-layer networks where cells are of similar size (e.g., macro network cells) and importance for real-time mobility. Multi-layer heterogeneous networks, including macro cell networks, pico cell networks, Femto cell networks, Metro cell networks, etc., do not fit this model. Large cells may be presented with additional, infrequently-used, small cell neighbors to manage. If those small cell neighbor relations are persistent in nature, the large cell neighbor lists are truncated or can become too large to broadcast in a timely fashion. This can prevent mobile stations from identifying sites that are potential handover candidates, and adversely affect mobile handover performance.

BRIEF DESCRIPTION OF THE DRAWINGS

Various non-limiting embodiments are further described with reference to the accompanying drawings in which.

DETAILED DESCRIPTION

Figure 1:
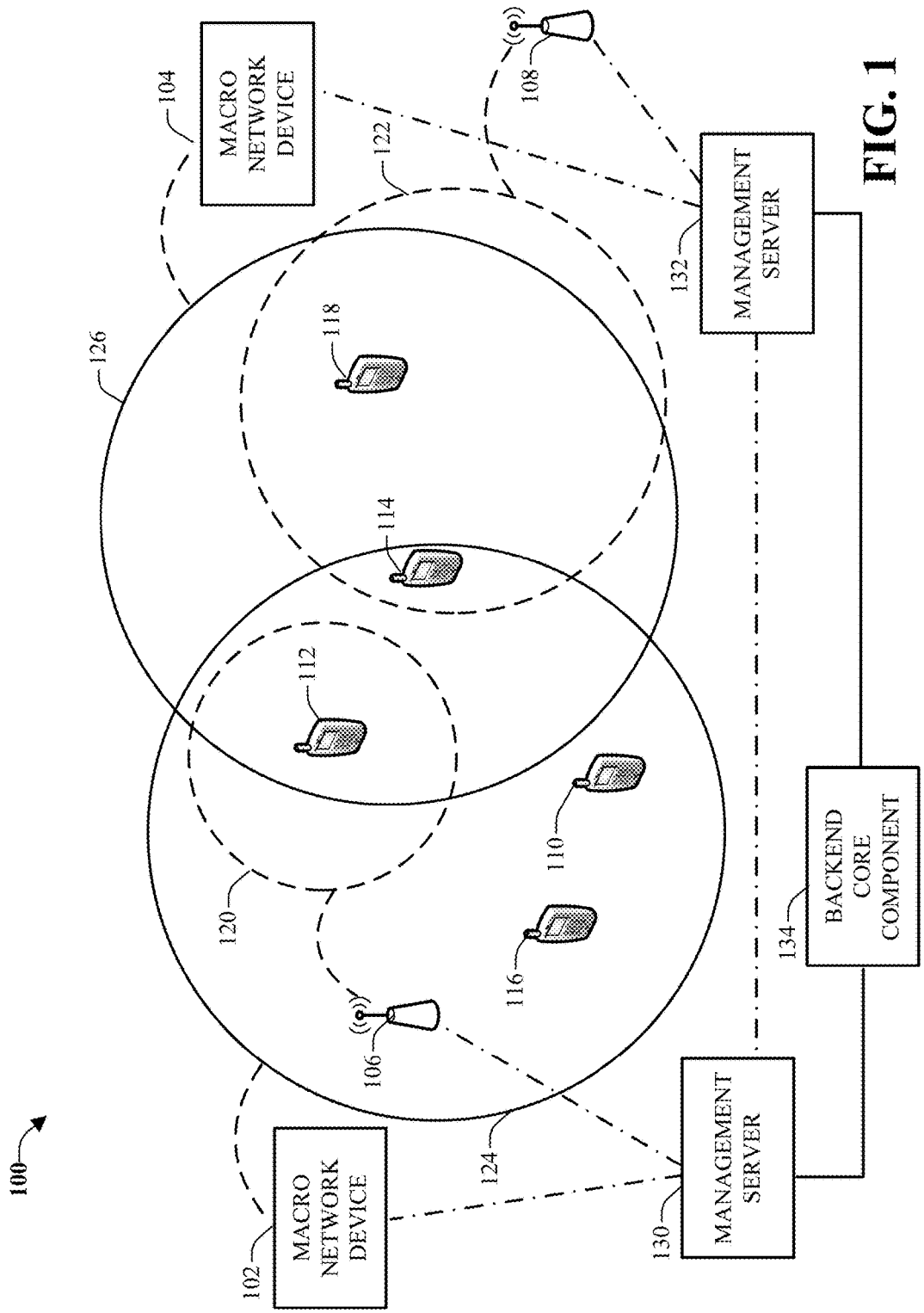
FIG. 1 illustrates an example, non-limiting wireless communications environment that can be utilized with the disclosed aspects.

Aspects of the subject disclosure will now be described more fully hereinafter with reference to the accompanying drawings that illustrate different example embodiments. In the following description, for purposes of explanation, numerous specific details are set forth in order to provide a thorough understanding of the various embodiments. However, the subject disclosure can embody many different forms and should not be construed as limited to the example embodiments set forth herein.

The management of small cell relationships or neighbor relations among multi-heterogeneous networks can ensure less delay in identifying sites or network devices having network coverage areas that are potential handover candidates. Network data (e.g., a network list, data store, network table, network candidate data or the like) can be utilized to store network neighbor relations or communication connections for handover potential among UEs. The network data can be dynamically updated, resorted and managed based on various network dynamics with each macro network cell device, the macro network neighbors and micro cell neighbors (e.g., Femto cell network devices, pico cell network devices, metro cell network devices or other network devices facilitating a network coverage area for mobile communication). For example, the network data can be a list, or data store having potential handover candidates, in which the data can be updated as network devices are added and deleted as potential handover candidates for the hand-off from one network to another network neighboring or having neighbor relations with the first network device. As a macro cell, for example, approaches or reaches a maximum amount of neighbor relations (neighbor connections), some neighbor relations can get dropped from the permanent list or truncated to accommodate additional neighbors as potential hand-over candidates. When these additional neighbors are not frequently used or have a low rate of attach attempts, dropping the neighbor relations of other cells can be an inefficient use of resources and cause delay among other UE's for potential hand-off.

In an aspect disclosed, an aggressive addition of neighbors is created by UE discovery of candidates, cell network listening schemes, or other automated processes, while avoiding the danger of creating permanent neighbor lists that are too long to be broadcast in an efficient manner or too long for a managing server or UE to efficiently scan. This method is particularly applicable to small-cells, Femto cells, closed subscriber group (CSG) cells, or other controlled access cells, that have small or restricted access coverage areas relative to a macro network device, and/or areas where there is pedestrian or low mobility, such that a very minor delay in hand-in to the cell caused by extra signaling to set up the neighbor relation would not adversely affect customer-perceived performance.

In one embodiment, various methods allow for infrequently-used, ephemeral, or restricted access cells that have had neighbor relations created via an automated process such as ANR to be deleted after a relatively short delay of fixed, calculated, or operator settable duration with minimal impact on performance and signaling load. This functionality can be deliberately applied to the non-macro layers in order to reduce impact and work with legacy macro systems. LTE and Femto specific mechanisms are described, for example, but the intended application is not limited to LTE or Femto. The embodiments herein can be applied, for example, to many other network layers and technologies than LTE and Femto examples, such as with any macro cell network devices and micro cell devices that comprise smaller coverage zones or coverage areas than the macro cell network devices. Macro LTE eNB (evolved node Bs or macro cell devices that can comprise macro level network nodes) or macro network cell devices can add and remove other LTE handover neighbors according to the 3GPP ANR. In addition, the macro eNB (macro network cell device) does not differentiate heterogeneous network layers, such as macro network devices and micro cell devices operating as neighbors in the same network environment for these neighbor additions and deletions. These operations can be addressed via specific ANR controls in the lower layer networks, specifically in Femto cell network devices or other micro cell network devices or micro cell network managing devices. Pertinent functionality is implemented for potential hand-off or handover from one network cell device to another in three stages: 1) construct available neighbor history for macro network, 2) operate neighbor (neighbor candidates, neighbor connections) addition, and 3) neighbor prioritization and cleanup.

FIG. 1 illustrates an example, non-limiting wireless communications environment 100 in accordance with various embodiments described. The wireless communications environment 100 can include a heterogeneous network environment that has a multitude of wireless communications networks, each having a respective coverage area. The coverage area of some of the wireless communications networks can overlap such that one or more network devices can provide coverage areas or zones to UEs or mobile devices whose coverage areas from different networks of network devices overlap. For example, a relatively large number of Femto access point (FAP) can have overlapping/neighboring coverage with each macro eNB sector carrier and operate as potential handover candidates from one network to another. The network devices of the heterogeneous network environment can operate with one another as a self-organizing network (SON), in which at least some of the network devices can be configured to provide self-configuration and self-optimizing capabilities that provide the ability to automate certain operations, management functions and system management functions. The SON incorporates self-configuration, self-optimization, monitoring, and operation management to allow the network devices to be communicatively coupled into the network and operate with little to no human intervention.

The wireless communications environment 100 includes one or more macro (cell) network devices 102, 104 that broadcast macro network zone coverage areas and one or more micro network devices 106, 108 (e.g., Pico network access point, Metro network access point, Femto network access point, or other similar micro network access points) deployed within the wireless communications environment 100 and servicing one or more UE devices 110, 112, 114, 116, 118 in corresponding network coverage zones. Each wireless communications network (e.g., macro access points 102, 104 and micro access points 106, 108) comprises one or more network devices (e.g., a set of network devices), such as base stations that operate in conjunction with one another in order to process network traffic (e.g., handoff operations and coverage) for the one or more UE devices 110, 112, 114, 116, or 118. The network devices (e.g., 102, 104, 106, 108) can be neighbors within one another that overlap or have coverage boundaries alongside or proximate to one another. For example, a number of FAPs or other micro network devices 106, 108 can overlap or have neighboring coverage with each macro network device 102, 104 respectively. The macro network devices 102, 104 can comprise a set of network devices that are cellular enabled network devices, which could provide different network speeds (e.g., 2G, 3G, 4G, etc.). In another example, the micro access point devices 106, 108 can include a set of network devices that extend network coverage or expand the network environment at the cell edge, especially where access would otherwise be limited or unavailable, and can include any standard such as for WCDMA, GSM, CDMA2000, TD-SCDMA, WiMAX, for LTE or other solutions.

The communications environment 100 can include one or more management servers 130, 132 that are communicatively coupled to the network devices such as the macro network devices 102, 104 and the micro network devices 106, 108 as a control-node for one or more networks. The management servers 130, 132 can operatively control UE device tracking and paging procedures including retransmissions and handover (hand-off) operations to ensure seamless mobility through various network zones within the network environment 100. The management servers 130, 132 can control, for example, the bearer activation/deactivation process and choosing a serving gateway for the UE devices 110, 112, 114, 116, or 118 at the initial attach and at the time of an intra-network handover (e.g., among the different networks, 4G to 3G, 3G to 3G or the like). Further, the network devices (e.g., macro network devices 130, 132 or micro network devices 106, 108) can include the management server 130, 132 respectively, and, thus, these and other management operations can be controlled by each network device itself with the management servers internal or independently external to the network devices. The management servers 130, 132 can authenticate UEs by interacting with the other devices communicatively coupled thereto and/or sets of data servers such as a home subscriber server and the like. The management servers 130, 132 can operate in conjunction with one or more backend packet core components 134 having a processor and memory that can operate to generate and allocate temporary identities to UEs and terminates Non-Access Stratum (NAS) signaling or other signaling protocol layers. The NAS can be used to manage the establishment of communication sessions (e.g., between UEs) and for maintaining continuous communications with the user equipment as the UE moves, such as for hand-over operations from network device to network device. The management servers 130, 132 can also manage signaling to the Access Stratum for carrying information over the wireless portion of the network and security key management operations (e.g., authentication, verification, authorization operations) with UE application data and UE device functions. In particular, one or more of the managing servers 130, 132 can operate to maintain and establish network relations via one or more base stations or network devices via an X2 interface or as a mobility management entity (MME) via an S1 interface, for example.

The communication environment 100 can operate to implement techniques for a heterogeneous network environment in a SON network that provide automatic configuration of neighbor cell relations, such as ANR, for example. The managing servers 130, 132 can operate as network devices that can facilitate ANR operations to configure discovered neighbor relations such that handovers can be performed in combination with neighbor relation establishment without dropping a UE connection to the networks of the network environment 100. In one example, the network environment can comprises a LTE environment that can comprise one or more evolved radio access networks (E-UTRAN) with corresponding network devices or macro network devices with micro network devices overlapping, and an evolved packet core, such as the backend packet core 134. Each cell can be served by an eNodeB, eNB (base station) or other macro network device, in which handover can pass between the macro network devices 102, 104 and/or the smaller (micro) network devices 106, 108, for example.

As illustrated, each of the one or more micro access points 106, 108 can have a corresponding service area 120, 122. In addition, each of the one or more macro network devices 102, 104 can have a corresponding service or broadcast area 124, 126. However, the wireless communications environment 100 is not limited to this implementation and various other architectures can also be employed. For example, the self-organizing network devices of the communication environment 100 can deploy any number of Wi-Fi access points and respective service areas within the wireless communications environment 100, further comprise other mechanisms than LTE Femto-specific mechanisms or devices other than LTE or Femto, and comprise other network layers and technologies.

A UE device can contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or UE device for example. A mobile device or UE can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. Each UE device 110, 112, 114, 116, 118 can be served by the macro cell devices 102, 104, or micro cell devices 106, 108, in which handovers can be controlled by a network data, data store, a data set, a data list, neighbor relation table (NRT), or the like that is managed or maintained by the managing servers 130, 132, a macro network device, a micro network device or the other network device, for example. The UE devices 110, 112, 114, 116, 118 can respectively broadcast an identifying signature or waveform, which can be an identification or fingerprint, that the network devices store from the UE devices as a time and frequency reference, as well as for identification. Each waveform can be enumerated by the Physical Cell Identity (PCI). The network devices of the network environment 100 can communicate broadcasts with UE devices comprising a globally unique cell identifier (CGI) as well and the network devices of the communication environment 100 can utilize UE ANR functions, in which UE devices can decode and report CGI information of neighbor cells to the serving cell upon request.

For example, a network device such as a macro cell network device 102 or 104 can maintain network data (e.g., an NRT) for each cell. The entries or candidates of the network data can comprise data that the network device utilizes about neighboring networks and network devices. Network device 102, for example, can have a complete knowledge of its neighbors, such as of network device 104, 106, and 108. Network devices 104, 106 and 108 can have a complete knowledge, an incomplete knowledge, or not be aware of all neighbors depending upon inaccuracies in signal propagation, maps data, or if a network has been newly installed.

In an example scenario, networks can service UE devices 110, 112, 114, 116, and 118 through one of the macro network devices 102, 104, or other micro access points 106, 108. As a UE device travels within the wireless communications environment 100, the respective UE device can move in and out of the coverage area of the associated serving network device. For example, as a user is sending/receiving communications through their respective UE device, the user might be walking, riding in a car, riding on a train, moving around a densely populated urban area (e.g., a large city), wherein the movement might cause the mobile device to be moved among various wireless communications networks. In such cases, it is beneficial to route the network traffic (e.g., handoff) from a serving network to a target network in order to continue the communication (e.g., avoid dropped calls). However, macro network devices 102, 104 can have large network zones or coverage areas overlapping or with neighbor relations with micro cell network devices that are infrequently used and managed by the macro network devices 102 or 104, for example. If the small cell or micro network device neighbor relations are persistent in nature, the neighbor lists in the NRT or other network data store can be truncated or can become too large to broadcast in a timely fashion. This can prevent mobile stations or other network devices from identifying sites or networks that are potential handover candidates, and adversely affect mobile handover performance.

In an aspect, infrequently-used, ephemeral or restricted access cells or network devices that have had neighbor relations created via an automated process such as ANR can be deleted after a relatively short delay of fixed, calculated, or operator settable duration with minimal impact on performance and signaling load. For example, non-macro layers, such as the micro network devices 106, 108 can be removed from a network data in order to reduce impact and work with legacy macro systems comprising the macro network devices 102, 104. Each macro eNB sector carrier or macro network device 102, 104 can support a limited number of X2 neighbor relations, such as, for example, twenty-four neighbor relations of other network devices communicatively coupled to one another. This list of 24 neighbors can include all heterogeneous network layers including macro network devices, Pico network devices, Femto network devices and the like. From the micro network device perspective, a relatively large number of micro network devices (e.g., FAP devices) can have overlapping neighboring coverage with each corresponding macro network device (e.g., macro eNB sector carrier device). As active UE (in-call or communicating UEs) approach micro/macro coverage boundaries, the UE devices can detect and report new neighbor information (PCI). If the detected PCI is not already populated as a neighbor in the data list or NRT, the macro cell devices and managing servers (e.g., eNB, FAP Elemental Management System (EMS) and/or MME) can operate to exchange pertinent information to build an interface connection (e.g., an X2) link and pertinent neighbor list entries. A network device such as the managing servers 130, 132 can operate to track the number of micro network device neighbors per macro network device, as part of ANR behavior, which can continue until the macro neighbor list or network data is full and unable to comprise more neighbor relationships. If the macro neighbor list is full, for example, a new X2 and neighbor setup connection will fail. This failure can operate as a trigger for the managing server 130 or 132, as a Femto cell EMS to begin heterogeneous neighbor list management.

The managing server 130 or 132, for example, can determine the capacity for neighbor relations for a macro neighbor list corresponding to a particular network device (e.g., macro network device 102 or other network device 104, 106, etc.) based on or in response to the failure to establish a new network connection or neighbor setup. The failure, for example, can indicate that the list, table or data tracking the neighbor candidates or entries is full, and the macro device 102 is not operable to establish further network relations. The failure can operate as a trigger event, in which the managing server or other network device (e.g., macro network device 102) maintaining the particular data set of candidate entries initiates management operations of the list. The capacity number can be determined according to the number of entries or potential handover candidates populated in the list at the time of the failure event. Alternatively or additionally, the capacity number can be based on a statistical analysis of the number of failures occurring in the list to establish a network connection and the number of entries within the list or network data at those times. For example, an average number based on a defined number of failure events over a period of time, especially when failure instances could occur for one type of network relation, but not for others, for example.

In one embodiment, a network device (e.g., the managing server 120 or other network device) can determine a threshold number of micro network devices that are allowed to populate the list or network data for a macro network device (e.g., the particular macro network device 102) in response to the failure event or an analysis that a capacity number of neighbor relations is being reached with greater frequency over a period of time. The threshold number can be determined to be less than the capacity number and also determined based on a number of macro network devices within the neighbor list for a particular time or time period, either before the failure trigger event or after. For example, the threshold number of micro network devices allocated for neighbor entries of the data can be based on a number of macro network devices within the network data or list that the micro network devices have an overlapping coverage zone with at the time of the failure trigger. The basis for determining the threshold number can be a one-to-one correspondence, another ratio, or a capacity for each macro network device of the network data store being managed to establish neighbor relations with the micro network devices, for example. The threshold number can be a number that initiates other trigger events for further analysis of the neighbor relation data and be considered as a threshold trigger or a soft threshold number for the additional analysis of neighbor relations within the communication environment 100. For example, as new micro network devices are added, the threshold number could be crossed or exceeded, but not exceed the capacity number without a failure to establish a network neighbor relation occurring or having a high probability of occurring.

After a neighbor relation entry or the network data for handover candidates exceeds the capacity number, further analysis of the network devices and statistical data corresponding to the different network devices within the network data as entries can be computed by the managing server 120 or other network device, in which the network data is associated with for maintaining neighbor relations. For example, where a Femto network device keeps track of neighbor relations for each macro network device and the micro network devices, when the micro network devices cross the threshold number within the data list, the Femto network device can remove current micro network device candidates or entries from the list based on the statistical analysis of those candidates.

For example, micro cell network devices can be ranked based on the number of attachment attempts by UE devices with respect to time or based on rates of attachment attempts by UE devices over a period of time from historical data collected. Different intervals of time could be considered and weighted, for example, based on a time of day, certain days of the week, seasonal dates, or the like. Based on the rankings, the network data could have certain micro network devices dropped as viable neighbor relation candidates, and other or new network data relations can be added for a network device attempting to establish as a network candidate. The neighbor relation data thus becomes dynamic and updateable for each network device and corresponding neighbor relations when the list becomes overly large, and/or failure conditions operate as triggering events. Other examples and implementations are further detailed below.

Figure 2:
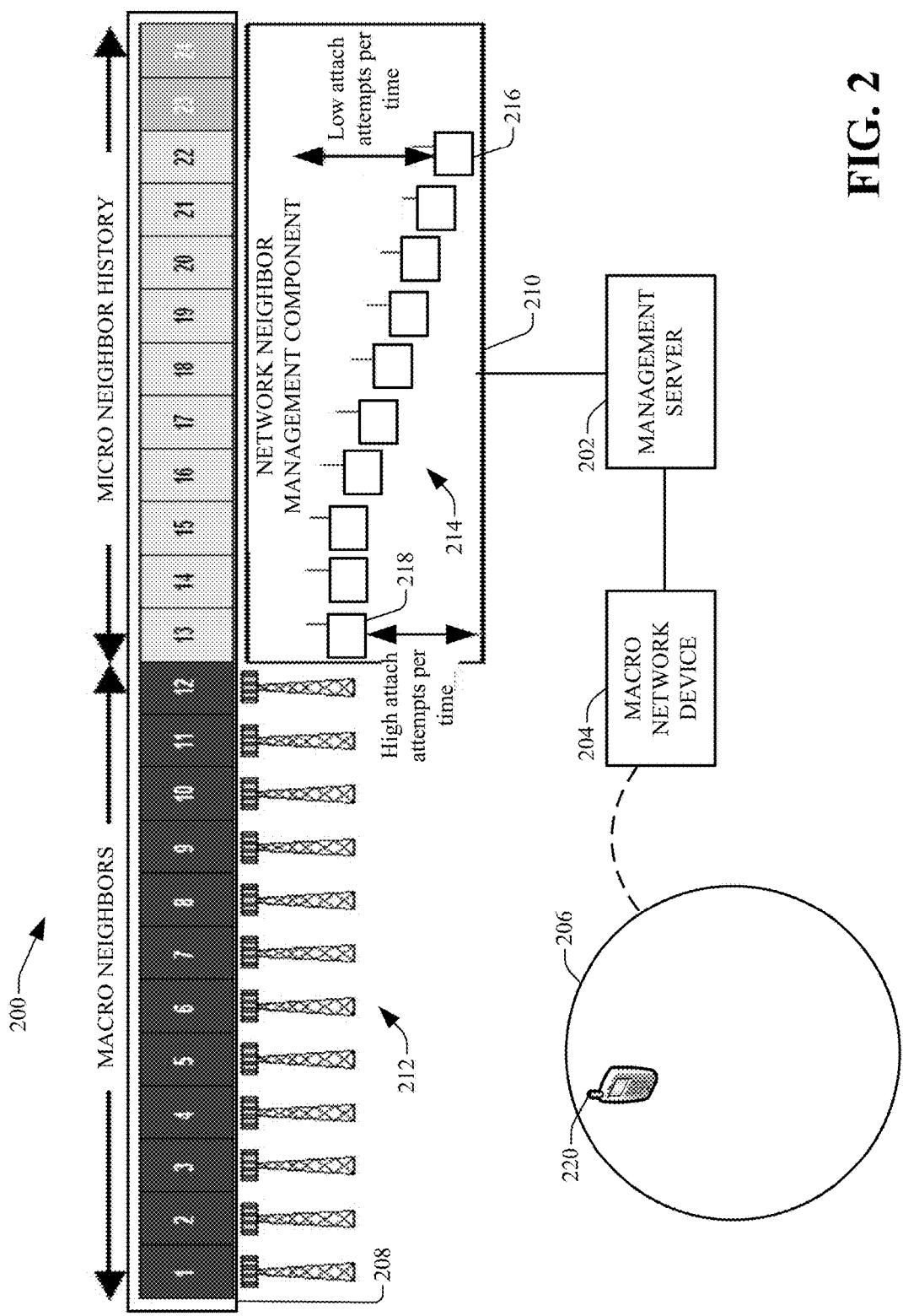
FIG. 2 illustrates an example, non-limiting system for establishing neighbor relations with network devices for potential handover of UE devices, according to an aspect.

Referring now to FIG. 2, illustrated is an example, non-limiting wireless communications environment 200 in accordance with various embodiments described. The wireless communications environment 200 can include a heterogeneous network environment that has a multitude of wireless communications networks, each having a respective coverage area. For example, a macro network device 204 facilitates a network coverage area or zone 206 that neighbors other coverage areas of macro network devices 212 and micro network devices 214. The coverage area of some of the wireless communications networks can overlap such that one or more network devices can provide coverage areas or zones to UEs or mobile devices whose coverage areas from different networks of network devices overlap. For example, a relatively large number of FAP can have overlapping/neighboring coverage with each macro eNB sector carrier, such as with the macro network device 204. The network devices of the heterogeneous network environment can operate with one another as a Self-Organizing Network (SON), in which at least some of the network devices can be configured to provide self-configuration and self-optimizing capabilities that provide the ability to automate certain operations, management functions and system management functions, such as in establishing network neighbor relations for potential handover of the UE device 220.

A management server 202 is communicatively coupled to the macro network device 204 and a network neighbor management component 210. The management server 202 is configured to facilitate self-configuration, self-optimization, monitoring, and operation management to allow the network devices to be communicatively coupled into the network and operate with little to no human intervention without delay for potential handover within the SON network environment 200. The management server 202 can be configured to communicate event data to the network neighbor management component 210. For example, the management server 202 can operate to program and communicate trigger events to the network neighbor management component 210. A trigger event can comprise, for example, one or more events such as a failure of a network device (e.g., a macro network device 212, a micro network device 214) to establish a neighbor relation entry or to establish an interface connection (e.g., an X2 interface link) with the macro network device 204 or another network device. Although the network environment 200 is illustrated for a macro sector carrier (the macro network device 204), other network devices of the heterogeneous network could also be considered and included for neighbor relations management via the management server 202 and the network neighbor management component 210.

Additional trigger events can comprise a number of entries in a network data 208 (e.g., a data store, candidate list, NRT, or the like) satisfying a threshold condition with a threshold (amount) number, and/or satisfying a defined amount of neighbor relation entries relative to the threshold number. For example, a threshold number of network device neighbor relations or handover candidates stored in the network data 208 can be set as a trigger. The trigger event can occur in response to the threshold condition being satisfied, such as meeting or exceeding a number of neighbor relations with macro network devices 212, micro network devices 214, a combination of macro and micro network devices in a particular ratio (e.g., 1 to 1, 2 to 1 or the like macro to micro devices with neighbor relations), or thresholds corresponding respectively to a determined number of macro network devices and micro network devices for established neighbor relations. The threshold number or a defined number relative to the threshold number can be less than the capacity number. The defined number, for example, can be less than the threshold number, which can enable a reserve capacity with respect to macro network devices or specifically for micro network devices to be able to establish future neighbor relations and initiate neighbor relation management operations in response to a trigger event, for example.

The threshold can be determined by the management server 202 and/or the network neighbor management component 210. The threshold can comprise a number of data entries or neighbor relations corresponding to macro network device neighbor relations and/or micro network device neighbor relations tracked with the data store 208. Additionally or alternatively, the threshold can be determined based on a capacity of neighbor relations with respect to a network device, such as the macro network device 204, or, in other words, that are communicatively coupled to the macro network device 204, or with which the macro network device 204 is potentially initialized or set up with for handover operations. For example, a capacity of neighbor relations for a macro sector carrier or macro network device 204 could be twenty-four entries, as illustrated. However, other capacities or numbers could also be determined based on a capacity of the network device (e.g., macro network device 204) to establish neighbor relations for potential handover candidates with the UE 220 from the network area 220. For example, the threshold number could be half the capacity number of network device neighbor relations entries or a number relative to the number of macro network device neighbor relations currently stored in the data store 208. For example, the threshold number could be determined to be twelve micro network devices that the macro network device 204 is operable to establish network neighbor relations with and perform handover operations for transfer of the UE device 220.

The threshold can comprise a number of micro cell network devices 214 with neighbor relations, for example, that are determined based on a number of macro network devices 212 with neighbor relation entries stored within a period of time in the data store 208. For example, within an hour or other time period twelve macro network devices 214 could have neighbor relations stored within the data store 208. As the micro network devices 214 overlap with or share boundaries with the macro network devices 212, the threshold number for neighbor relations with micro network devices 214 can be determined to be ten or a number that is equal to or less than the number of macro network devices 212 with neighbor relations already stored in the data store 208. Alternatively, the threshold number of neighbor relations for micro network devices 214 could be greater than the number of macro device neighbors tracked with the data store 208. The threshold number determined can also be less than the capacity number without a probability of failure occurring. Consequently, a trigger can include the threshold number or threshold condition being satisfied, such as a number of neighbor relations corresponding to the micro network devices 212 exceeding or meeting the threshold number of relations designated for the micro network devices within the data store 208.

Further, the management server 202 is configured to determine a defined number of neighbor relations for a particular type of network device operating within the network environment 200, such as for micro network devices 214, which can include Femto cell devices, Pico cell devices, Metro cell devices, and the like. The defined number can be a number that defines a defined condition as a trigger event for initiated management operations for the neighbor relations and the data store 208, for example. The defined number can be defined specifically for all micro cell network devices and corresponding neighboring networks that are brought online or in communication with the network environment 200 as potential neighbors for a particular macro network device (e.g., 204). The defined number can be determined to be equal to or less than the threshold number for a threshold condition. For example, the threshold number can be determined to be twelve for Femto or micro network devices because twelve macro network devices 212 have established neighbor relations that the micro network devices can overlap with, and/or based on other factors, such as the capacity number of network relations, as discussed above. In addition, the defined number can be determined based on the threshold number, and be determined to be less than twelve, such as ten. In this example, a second or additional trigger event can be a micro network device 214 attempting to connect or establishing neighbor relations with the macro sector carrier or macro network device 204. In this case, the number of micro network devices 214 with neighbor relations in the data store 208 becomes eleven and exceeds the defined number. The number does not exceed the threshold number or the capacity number for neighbor relations, but can further trigger management operations to ensure that the threshold is not exceeded.

In accordance with the above example, the network management component 210 is configured to further analyze the data store and the statistics of operation for the micro network devices 214. The network management component 210 operates to determine a statistical use of the micro network devices 214. A statistical profile can be generated and stored within the data store 208 corresponding to each one of the network devices. With regard to managing the micro network devices 214, a statistical average of attach attempts can be determined as a function of an interval of time (e.g., the last hour from the initialization or setup of the additional micro network device as a neighbor), provided as part of the statistical profile. The number of attach attempts of UE device to the corresponding networks can be used to assess frequency of use, common travel paths, high usage for particular times, data periods or time of the year with regard to seasonal use of the particular network. Work hours or lunch hours in a day could prompt more use during certain other hours for UE devices to travel through, for example. A rate of attachment could be determined for each network device. As such, the network neighbor management component 210 can assess attach attempt rates of the micro network devices 214 that have establish neighbor relations.

In addition, UE device parameters can be also factored into the statistical profile for potential handover candidates with other network devices, such as mobility, location, direction, speed, and the like, as well as times and locations of the network devices or the network environment 200 conditions for determining the priority of the micro network device and corresponding neighbor relations/connections. For example, where a new network device, such as a new micro network device is more active during a certain time of day, the time frame for analysis of the number of attach attempts could be delayed for the newly added neighbor connection with the new micro network devices because the management server 202 or the network neighbor management component 210 has ascertained this is a high activity time for this particular network relation compared to other times. Thus, maintaining the neighbor relations and connections for the newly joining or connection network devices would be more efficient event though previous times have indicated little or no activity (e.g., attach attempts).

The network neighbor management component 210 is configured to prioritize and clean the network neighbor relations established and stored within the data store 208. The prioritization can be established based on a rank of the micro network devices 214, which can increase or decrease in rank based on the statistical profile. For example, the micro network device 218 can comprise a high rate of attempts per time period (e.g., within an hour, time of day, or other set of time period and dates). Conversely, the micro network device 216 has a number of low attach attempts per time period. The network neighbor management component 210 can thus determine that micro network device 218 has a higher rank or a higher priority than other micro network devices 214 for maintaining neighbor relations or keeping a more permanent neighbor relation entry in the data store 208, for example, such as the micro network device 216. As a result, the network neighbor management component 210 is configured to delete or cancel the neighbor relation (e.g., an X2 interface link) corresponding to the micro network device 216. The entry can be deleted or canceled from the data store 208 for identifying the micro network device 216, such as with PCI or the neighbor information pertaining to the device 216. The network neighbor management component 210 is configured to prioritize and cleanup the neighbor relations and corresponding data in the data store in order to decrease the number of neighbor relation entries for the data store 208 to a number of micro network cell devices to be at or below the defined number. For example, where the defined number is ten micro network devices 214, and the number has increased beyond ten, the network neighbor management component 210 operates to maintain the defined number by prioritizing and removing micro network devices with established neighbor relations to satisfy the defined number for the defined condition. Alternatively or additionally, the prioritization and removal operations generated by the network neighbor management component 210 can be based on a tier of the statistical profile and ranks. For example, a top tier of network devices and corresponding neighbor relations could be kept and a bottom tier could be removed by the prioritization and cleanup (or removal) operations initiated by the network neighbor management component 210. For example, the micro network devices having a low attach attempt rate, or low attach attempt success rate, or an attach rate attempt that is below a bottom threshold (e.g., no attempts within a period of time, or equal to the attach attempt rate of the lowest micro network device 216) could be removed to allow for further periods of time between prioritization and cleanup operations to be performed.

The management server 202 and the network neighbor management component 210 are configured to dynamically determine the various conditions (e.g., the threshold condition, the capacity number, and/or the defined condition and respective numbers) based on the changing conditions of the neighbor relations. For example, given the above example of FIG. 2, data store 208 can be expanded or decreased depending upon the determination of the threshold number for a threshold condition or the other conditions (e.g., capacity condition/number, and/or change in the defined condition/number or success rate). When an increase in the number of macro network devices with neighbor relations for a given time period occurs, the threshold number corresponding to the number micro network devices for neighbor relations could be changed, and thus, the defined number operating a trigger for prioritization and cleanup operations can also be re-assessed, or re-determined.

The network neighbor management component 210 can operate to analyze and manage the entries of the data store 208 based on a period of time, a trigger event occurring or being communicated via the management server 202, for example. In response to a trigger event, such as a failure of a network device establishing a neighbor relation or to be communicatively coupled to the macro network device 204 via an entry in the data store 208 or an interface connection failing to generate when a network device is detected, the network neighbor management component 210 can operate to determine data about the data store 208 for a determination of the capacity number and a threshold number as another threshold event. For example, the network neighbor management component 210 can receive the failure event trigger and initiate data analysis that determines a number of macro network devices 212 with neighbor relation entries in the data store, the number of micro network devices 214, and set a capacity number of total neighbor relation entries corresponding for the data store 208 to store entries. The management server 202 can analyze the data and determine a second threshold event in response based on the capacity number for neighbor relations to be established and other criteria discussed above such as a relative number of other network devices (e.g., macro network devices, micro network devices or other network devices) that have established network neighbor relations (e.g., X2 interface connections or some other interface link). The network neighbor management component 210, the management server and/or the macro network device 204 can operate to determine and monitor the data store 208 according to the threshold number determined as a second trigger mechanism. For example, the threshold number could be determined to be twelve or a number less than the capacity number or number of macro network devices 212. The defined condition could be determined to be less than the threshold number based on a defined interval for reserve, such as two less or less than two to enable other devices to establish network relations and maintain greater dynamics in establishing neighbor relations.

Consequently, the operations of the network environment 200 in a heterogeneous network of different macro and micro network devices with less coverage area, and/or overlapping the coverage zones of a macro network, provide an automated means to optimize large neighbor lists in complex layered networks. Neighbors are maintained when/where needed most, and removed when/where needed least. Mobility probability in a set of statistics or a statistical profile can be considered in the neighbor operations among the components/devices of the network to before neighbors and neighbor relations/connections (e.g., neighbor networks and corresponding network devices) are deleted. Thus, the risk of a delayed handover, neighbor list instability and associated signaling overhead can be reduced.

Figure 3:
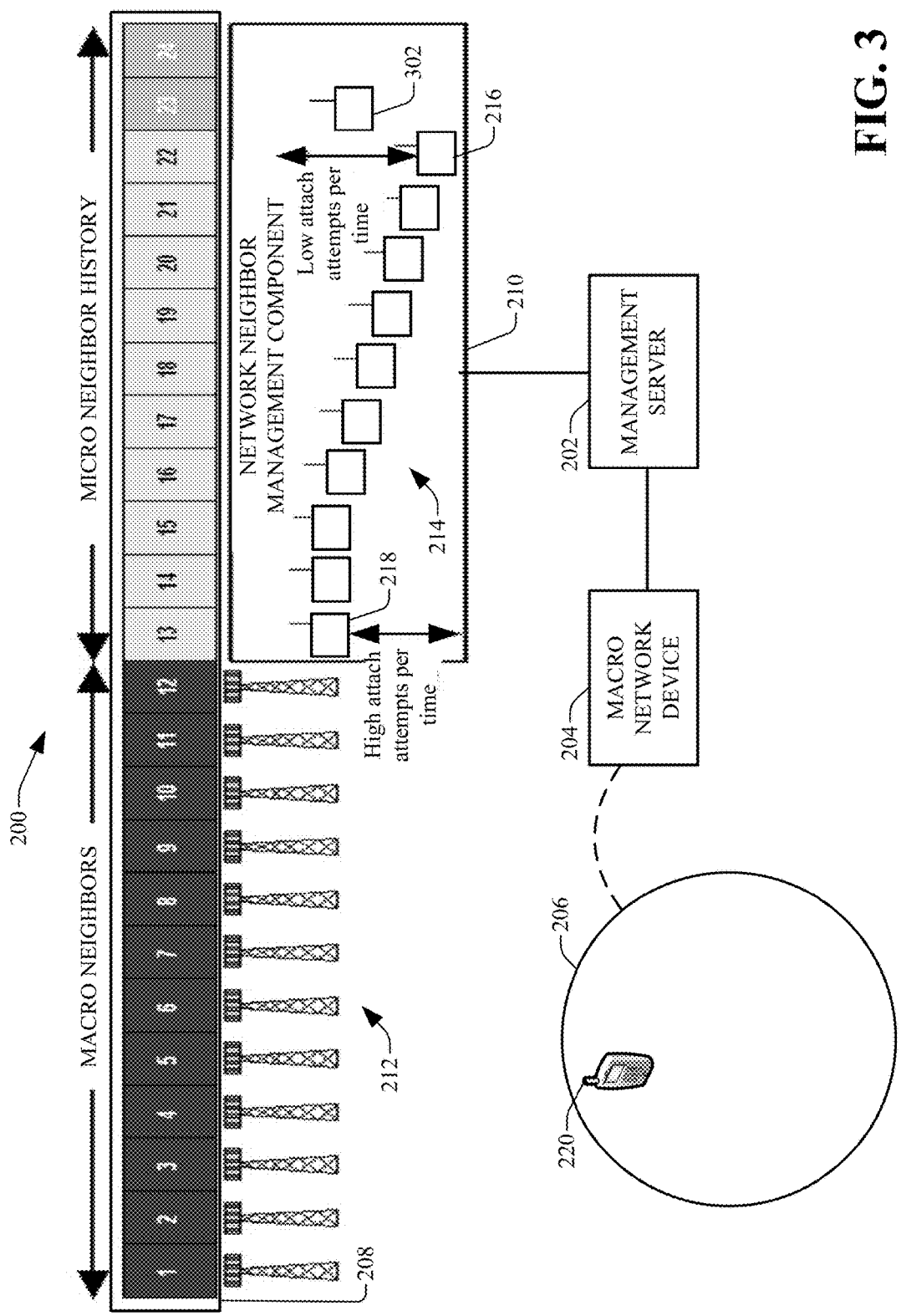
FIG. 3 illustrates another example, non-limiting system for establishing neighbor relations with network devices for potential handover of UE devices, according to an aspect.

Referring now to FIG. 3, illustrated is another example of the environment 200. A micro network 302 has newly established neighbor connections with the macro network device 204 and is operable as a potential handover candidate for the UE device 220. The management server 202 is configured to detect the new network neighbor connection relationship with the macro network device 204, for example, and enters the data store 208 with the identifying information (e.g., PCI data or other identification data) to operate normal neighbor relations automatically, such as part of 3GPP ANR for LTE neighbors or for other network types (e.g., 4GPP, Wi-Fi, etc.). The management server 202 can operate to communicate a trigger event, in the case that a defined number for a defined condition has been satisfied or met, such as when the number of micro network devices 214 with neighbor relations established has exceed the defined number of ten, or some other determined defined number.

The network neighbor management component 210 can operate in response to the trigger event, such as the defined number being less than the number of micro network devices neighbors that are set up or having interface connections for potential handover candidates within the network environment 200. In response to the trigger event, the network neighbor management component 210 can analyze the statistical or data of the statistical profile and perform prioritization and cleanup of the neighbor relations and ANR data of the data store 208 as discussed above.

Figure 4:
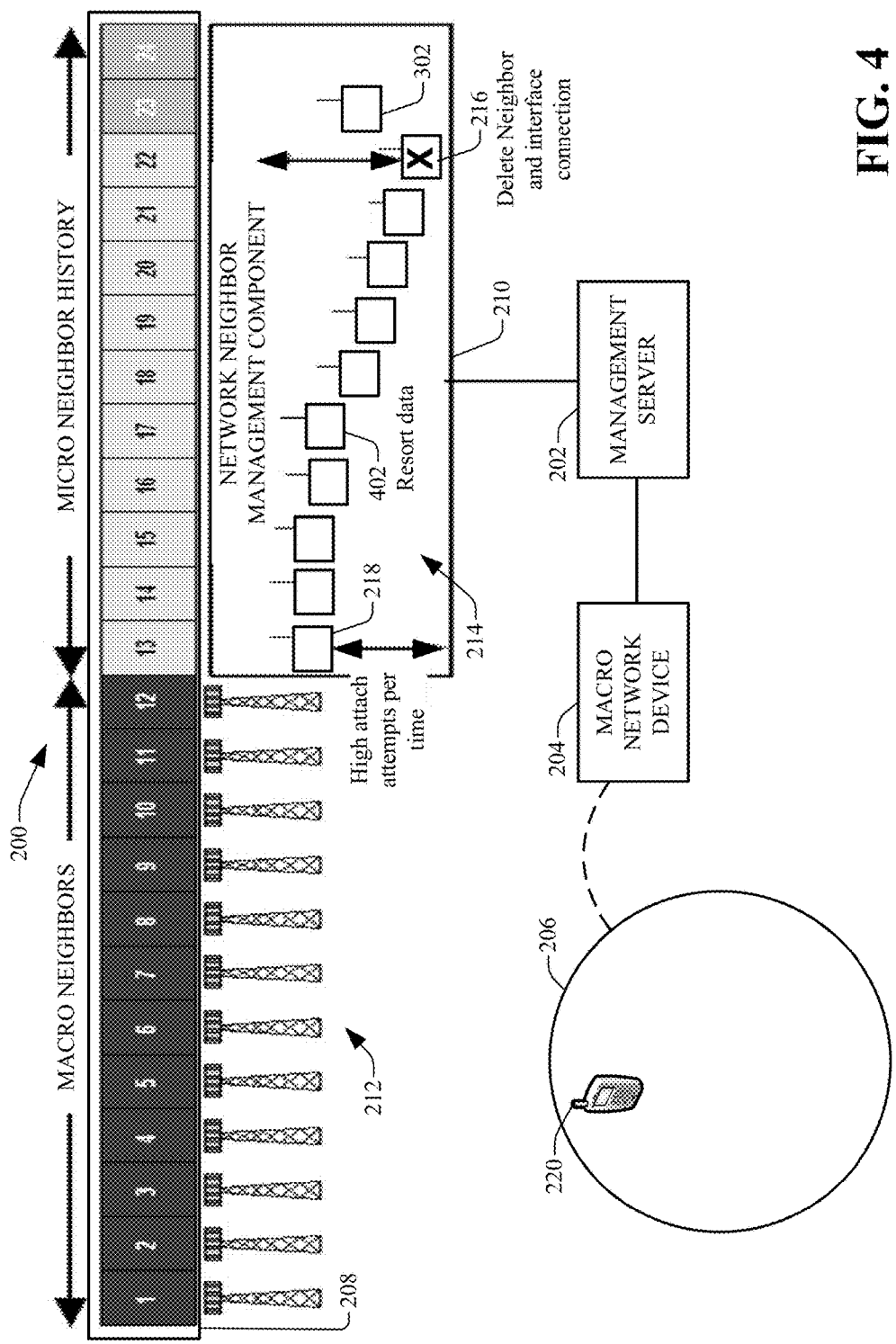
FIG. 4 illustrates another example, non-limiting system for establishing neighbor relations with network devices for potential handover of UE devices, according to an aspect.

Referring now to FIG. 4, illustrated is another example of the network environment 200 in accordance with embodiments described. The network neighbor management component 210 operates to resort the data of the neighbor relation statistics and determines different priorities based on different statistics of attach attempts over one or more time periods for analysis. As described above, the network neighbor management component 210 can determine a statistical profile of the networks devices, such as the micro network devices 214 that have initiated and established neighbor relations (e.g., X2 or other interface links) for each macro network device, such as macro network device 204 or other network devices.

The resorting operations of the network neighbor management component 210 can result from the defined number (e.g., 10 according to the above example) being exceeded or met based on a defined condition being satisfied. The result of resorting or prioritization operations determines, for example, that the micro network device 402 has increased in priority according to a different rank being determined from among the micro network devices 214. The statistical profile can comprise a graph or chart with respect to time or as a function of attach attempt clusters with respective dates, or other graphical analysis that is dynamic for the statistics of each micro network device. Thus, the micro network device 402 has been moved upward relative to the position represented in FIGS. 2 and 3 of the example embodiments based on the change in priority for handover operations with the UE device 220 or other UE device.

The network neighbor management component 210 can operate to cancel the lowest priority network devices, such as the micro network device 216. The network neighbor management component 210 can initiate cleanup at various times, and dynamically as network conditions or activity (e.g., an increase in UE device data delivery or communications) increase. The cleanup or removal of micro network devices, for example, can occur at the instance of the defined number being exceeded or in a time frame thereafter based on whether the newly added micro network device 302 is included in the analysis or not. When the micro network device 302 is included for cleanup, the prioritization operations can be initiated after UE device operations are not continued or ceased, or based on the probability of handover according to the UE devices mobility at the time of prioritization. Consequently, UE device parameters can be factored into the statistical profile for potential handover candidates with other network devices and removed accordingly.

Figure 5:
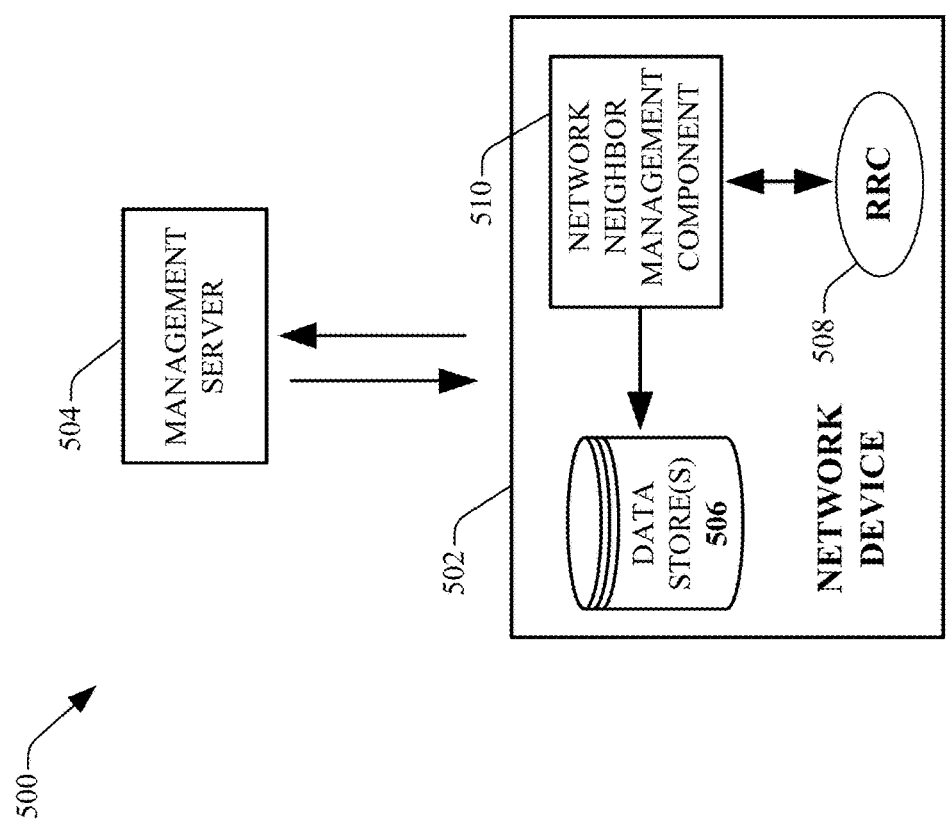
FIG. 5 illustrates an example, non-limiting system for network communications between communications network devices for potential handover of applications of a UE device, according to an aspect.

Referring now to FIG. 5, illustrated is an example of network devices operable to manage neighbor relations corresponding to a network communication environment of a heterogeneous network. A network 500 comprises a network device 502 such as a Macro evolved NodeB device, a Femto cell network device or other network cell device that operates to provide a coverage area for UE devices. The network device 502 comprises a data store(s) 506, a Radio Resource Control (RRC) component 508, and a network neighbor management component 510.

The network device 502 can be communicatively coupled to management server 504 that can provide maintenance and operations control to the network device, as well as ANR functions within 3GPP or other protocols. The data store 506 can operate as a NRT to store and maintain neighbor entries for potential network neighbor candidates in a handover operation. The NRT entries can be managed or defined by the management server 504 when ANR or neighbor relations management component 510 is implemented. However, base stations such as the network device 502 can be launched without entries initially. Each NRT entry or neighbor relation/connection can be uniquely identified by a target cell identifier. If the target cell is an LTE cell at the same frequency, the identifier is the CGI, and NRT also contains the PCI. It is the CGI that the network device 502 uses when signaling to another network device via the management server 504, since the management server 504 can route messages based on network device identity which is a part of CGI. The CGI is also used when acquiring the IP address of another network device, which is used for X2 interface or another interface (e.g., S1) establishment. Additionally, the NRT entry contains information about the interface connection availability, whether the network neighbor management component 510 can remove the neighbor relation, and whether the neighbor relation can be used for handover or not.

The network neighbor management component 510 can function to automatically add and remove entries to/from NRT or data store 506. Additions are driven by the RRC component 508 signaling between the network devices (e.g., macro or micro network devices) and mobiles, which provides measurement control and reporting means. The RRC component can be used to define measurements of candidate cells, which means that the mobiles or UE devices report measurement information to the serving base station or network device 502, and upon request the mobile also decodes and reports the unique CGI information.

In one embodiment, each network device 502 (e.g., macro eNB sector carrier) can support a limited number of X2 neighbor relations (e.g., a capacity number). For example, the figures discussed above used the example of twenty-four entries, although other capacity numbers could also be functional depending upon the type of network device (e.g., macro, micro, Wi-Fi etc.). This list or network data of 24 neighbors includes all heterogeneous layers including macro, Pico, Femto etc. From the Femto network device or other micro network device perspective, a relatively large number of FAP or micro network device access points have overlapping/neighboring coverage with each macro network device (e.g., a macro eNB sector carrier device. As active UE devices (in-call or communicating on the heterogeneous network) approach the macro/micro coverage boundaries they will detect and report new neighbor information (PCI). If the detected PCI is not already populated as a neighbor, the macro network device (e.g., eNB), the micro network device and/or management server 504 can exchange pertinent information to build an X2 link and pertinent neighbor list entries in the data store 506. The network neighbor management component 510 can be specific for each macro and/or micro network device (e.g., as a Femto element management server (EMS)) can operate to track the number of Femto neighbors per macro network device (e.g., per macro eNB sector carrier). The network automatic neighbor behavior can continue until the neighbor list is full, such as with macro network device neighbor relation entries or candidate entries. If the macro neighbor list is full, the new X2 and neighbor setup will fail. This failure is a trigger for the network neighbor management component 510 (e.g., as Femto EMS) to begin heterogeneous network neighbor list management.

For example, assume the neighbor list maximum size (capacity number) is twenty-four and the ANR failure occurs for the thirteenth micro neighbor addition attempt. In this case the network neighbor management component 510 can automatically determine that the maximum number of micro network device neighbors is twelve or some other threshold number defined for the micro network devices. The network neighbors can be dynamic, such as for Macro LTE neighbors, and thus, the neighbors can be added and subtracted as coverage and user distribution change. The network neighbor management component 510 or the management server 504 will occasionally or at defined intervals re-test limits beyond twelve micro network device neighbors, but the limit is assumed to be twelve for illustration.

Macro ANR neighbor additions, for example, can be relatively fast, but removals can be relatively slow. Thus, it can be impractical to remove neighbors fast enough to support fast additions when the neighbor list is otherwise full. For this reason the network neighbor management component 510 can maintain at least one empty neighbor list position (in this case 2) to allow for rapid neighbor addition before neighbor re-sorting and cleanup. In this case the maintained micro network device neighbor list size is ten as a defined number relative to the threshold number.

As active UE (in-call) approach Micro/Macro network device coverage boundaries they will detect and report new neighbor information (PCI). If the detected PCI is not already populated as a neighbor, the devices and components of the network will exchange pertinent information to build an X2 link or other interface connection and pertinent neighbor list entries are populated in the data store 506. This activity can result in a successful handover from macro network devices (e.g., a macro LTE sector carrier) to micro network devices (e.g., a Femto network device). The network neighbor management component 510 is configured to update the number of micro network device neighbors per macro network device. In this case the number of micro neighbors has increased from ten to eleven, which is beyond the maintained micro network device neighbor list size (threshold number).

The network neighbor management component 510 can operate to be able to detect and remember the number and rate of attach attempts from nearby UE devices. This is an indication of the number of nearby users and their mobility. This is also an indication of the probability of more incoming handover attempts. That is, in cases where more nearby UE device attempt exists to attach to the micro network device then there is a higher probability that at least one nearby UE device shall require handover to the micro network device. Ideally existing neighbor relations are in place before the handover is needed, but not necessarily. Micro network devices with a high rate of attach attempts therefore require more permanent neighbor relations than micro network devices with a low rate of attach attempts. This therefore can reduce the need to repeatedly add and delete the same neighbor relation. Micro network devices with a low rate of attach attempts likely will not experience handover with a macro network device any time soon. Removing these neighbors quickly leaves neighbor list room and time for other micro network devices in a more active dynamic network environment. For these reasons, the micro network neighbors (towards a specific macro sector carrier) are ranked according to the rate of attach attempts. If necessary to remove neighbors to stay within the maintained micro network neighbor list size (the defined number), micro network devices with a low rate of attach attempts are removed first. Micro network device neighbor lists are constantly re-sorted as new neighbors are added and deleted. Micro network device neighbor lists also expand or contract according to the detection mechanisms discussed above. According to the prior example, the eleventh Femto neighbor was added. Next the Femto neighbor list is resorted according to the rate of attach attempts. Finally the eleventh Femto neighbor (at bottom of the list=lowest rate of attach attempts) can be removed by the network neighbor management component 510, for example. This clears space for new neighbors to be quickly added to the Micro/Macro neighbor list as required. An advantage of these operations is that it enables heterogeneous networks to proactively adapt to dynamic neighbor scenarios typical for heterogeneous service areas.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 6:
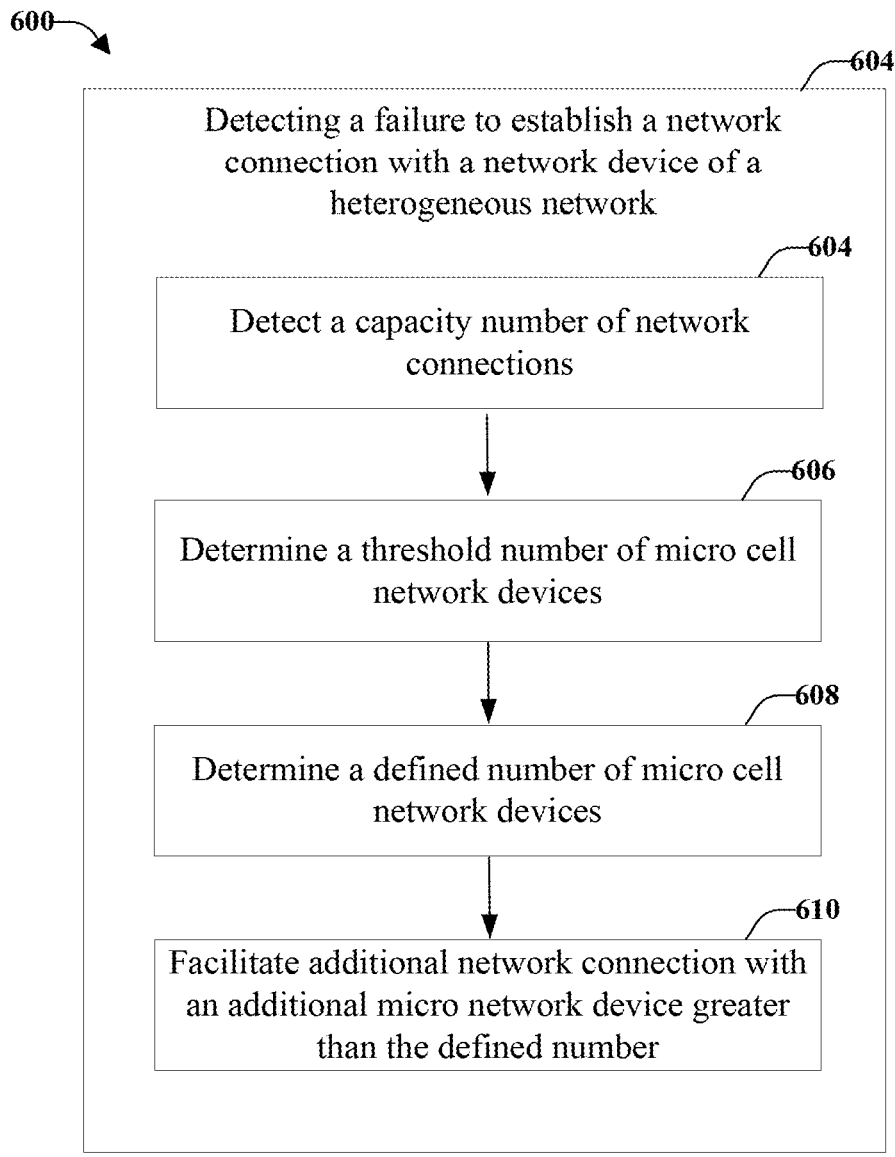
FIG. 6 illustrates an example, non-limiting method for managing neighbor relations among network devices, according to an aspect.

FIG. 6 illustrates an example, non-limiting method 600 for managing neighbor relations, according to an aspect. At 602, a failure to establish a network connection with a network device of a heterogeneous network is detected. The failure, for example, can be a failure of a network neighbor relation to be ascertained such as via an X2 interface connection or other interface link with neighboring network devices for a potential handover for a UE device in the heterogeneous network. At 604, in response to the detected failure, a capacity number of network connections (e.g., neighbor relations or interface link connections) is detected with which the network device is operable to establish with a set of macro cell network devices and a set of micro cell network devices.

At 606, a determination is made of a threshold number of micro cell network devices with which the network device is operable to establish the network connection. For example, determining the threshold number of micro cell network devices can be based on the number of micro cell network devices corresponding to macro cell network devices that have network connections to the network device and the capacity number of network connections detected.

At 608 a determination is made of a defined number of micro cell network devices that is less than the threshold number of micro cell network devices with which the network device is operable to establish the network connection.

At 610, an additional network connection is facilitated with an additional micro network device to the network device that causes a number of micro cell network devices connected to the network device to be greater than the defined number of micro cell network devices.

In one embodiment, the method 600 can comprise determining, by the device, a number of connection attempts to the set of micro cell network devices. In addition, a rate of connection attempts to the set of micro cell network devices. The set of micro cell network devices can be ranked based on the rate of connection attempts to the set of micro cell network devices. In response to the number of micro cell network devices communicatively connected to the network device being determined to be greater than the defined number of micro cell network devices, at least one network connection of at least one micro cell network device to the network device can be removed based on the number of attach attempts or the rate of connection attempts to one or more micro cell network devices.

The method 600 can further comprise modifying the threshold number of micro cell network devices based on a change in a number of macro cell network devices or micro cell network devices connected to the network device such as by neighbor relations or neighbor interface links for potential handover candidates.

Figure 7:
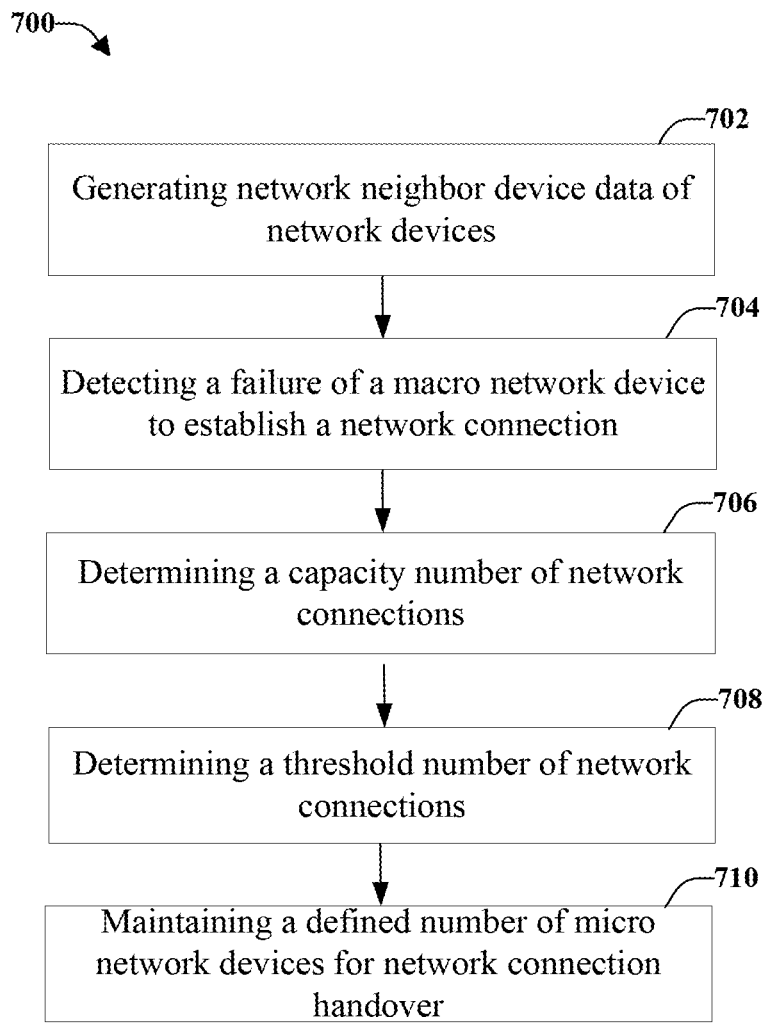
FIG. 7 illustrates another example, non-limiting method, for managing neighbor relations among network devices according to an aspect.

FIG. 7 illustrates an example, non-limiting method 700, according to an aspect. At 702, the method 700 comprises generating network neighbor device data of a set of macro network devices comprising macro coverage zones and a set of micro network devices comprising micro coverage zones that overlap with the macro coverage zones, wherein the set of micro network devices and the set of macro network devices are communicatively coupled to a macro network device of a heterogeneous network.

At 704, a failure of a macro network device to establish a network connection (e.g., a neighbor relation interface link) with a network device (a macro network device or a micro network device).

At 706, in response to detecting a failure of the macro network device to establish a network connection with a network device, a capacity number of network connections with the macro network device is determined based on the network neighbor device data, such as neighbor relation entries or connections. At 708, a threshold number is determined from the network neighbor device data. The network neighbor device data represents, for example, the set of micro network devices with which the macro network device is operable to establish the network connection based on the capacity number of network connections and a number of macro network devices of the set of macro network devices.

At 710, defined number of micro network devices that is less than the threshold number of the network neighbor device data is maintained. Maintaining the defined number of micro network devices that is less than the threshold number of the network device data can further comprise facilitating the network connection with an additional micro network device. The number of the set of micro network devices in connection with the macro network device can also be greater than the defined number of micro network devices. Maintaining the defined number of micro network devices that is less than the threshold number of the network device data can further comprise generating a rank of the set of micro network devices based on an attach attempt rate, and removing the network connection of at least one micro network device to the macro network device based on the rank.

In one embodiment, the method 700 can comprise modifying the threshold number in response to an additional macro network device of the set of macro network devices being determined to have established the network connection (neighbor relation link) with the macro network device for potential handover with a UE device. In addition or alternatively, the threshold number can be modified in response to at least one macro network device of the set of macro network devices being determined to have been removed from the network connection with the macro network device.

Figure 8:
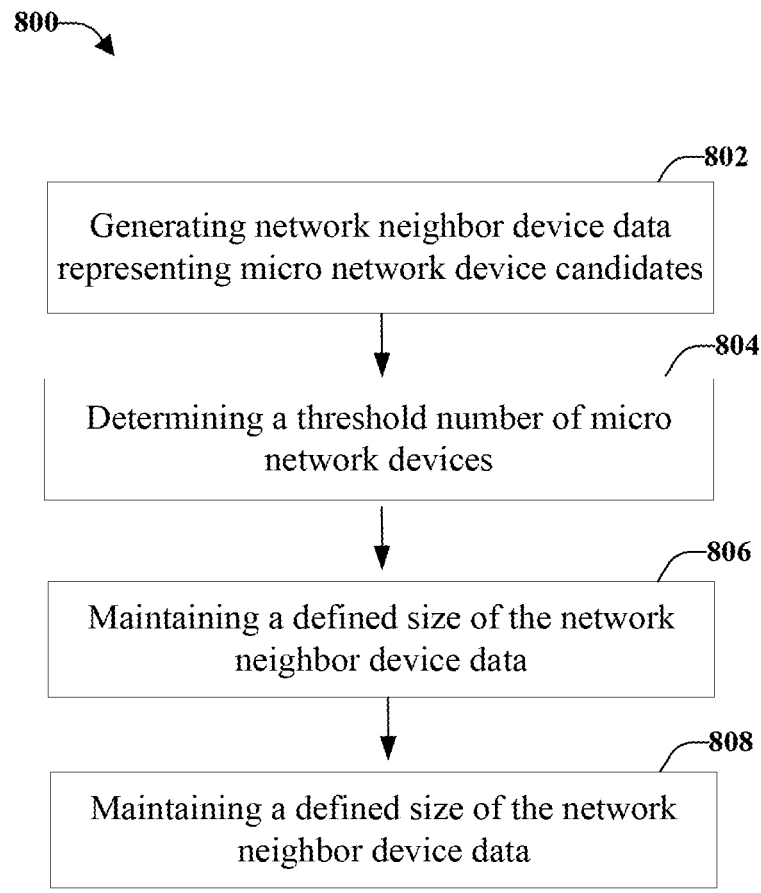
FIG. 8 illustrates another example, non-limiting method for managing neighbor relations among network devices, according to an aspect.

FIG. 8 illustrates another example, non-limiting embodiment of a process flow 800. At 802, network neighbor device data is generated that represents micro network device candidates that neighbor a macro network device in a heterogeneous network comprising micro network devices and macro network devices for a potential transfer from the macro network device.

At 804, determining a threshold number of micro network devices with which the macro network device is operable to establish a neighbor relation is determined. The determining the threshold number of micro network devices can be initiated in response to a failure to establish the neighbor relation with the additional micro network device.

At 806, a defined size of the network neighbor device data representing the micro network device candidates that is less than the threshold number of micro network devices with which the macro network device is operable to establish the neighbor relation is maintained. The maintaining the defined size of the network neighbor device data can comprise generating a priority of the micro network device candidates of the network neighbor device data, and removing at least one micro network device candidate from the network neighbor device data based on the priority, which can be in response to the facilitating the additional neighbor relation with the additional micro network device.

At 808, an additional neighbor relation is facilitated with an additional micro network device that is detected within the heterogeneous network, and not already included in the threshold number of micro network devices.

Figure 9:
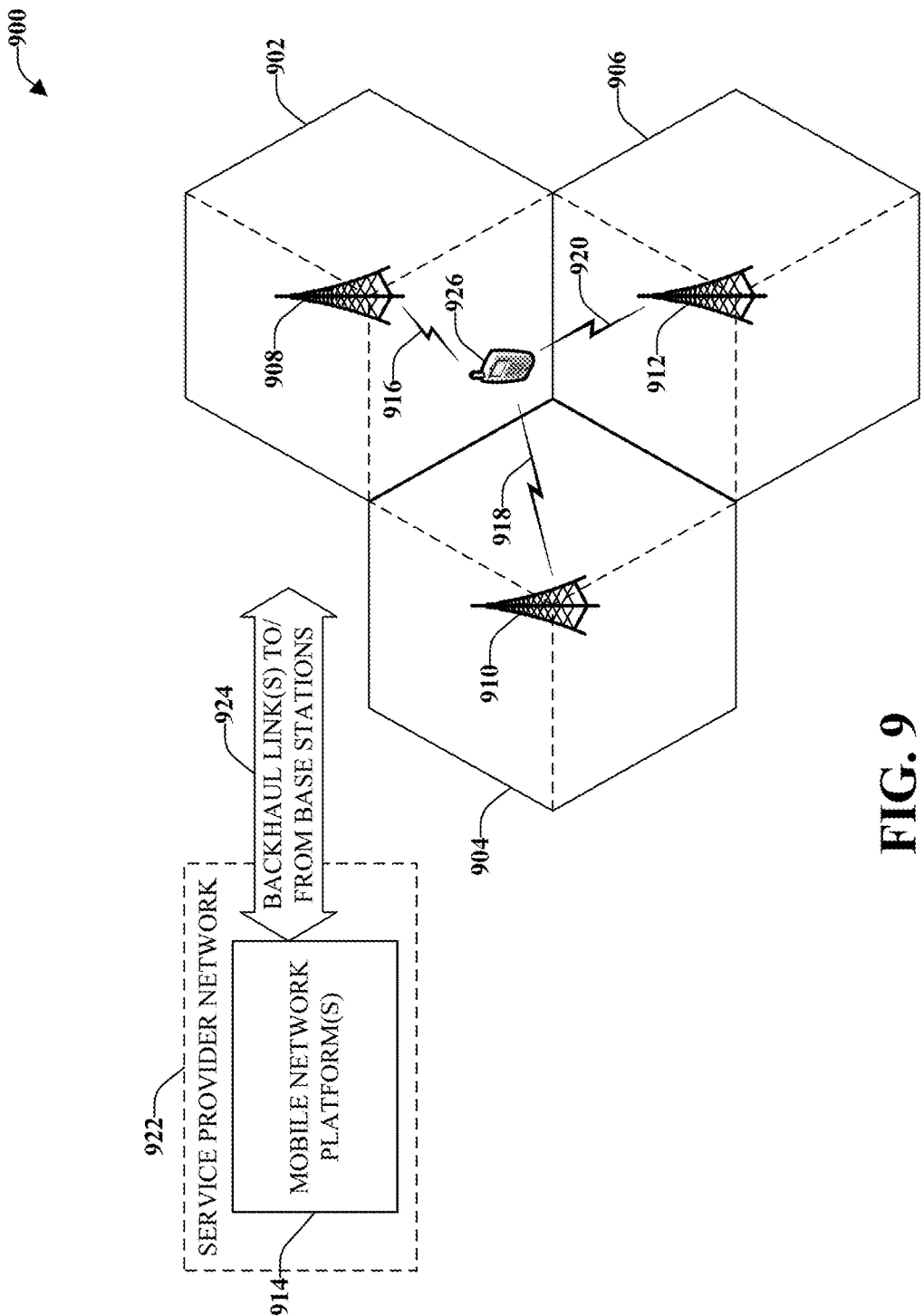
FIG. 9 is a schematic example wireless environment that can operate in accordance with aspects described herein.

By way of further description with respect to one or more non-limiting ways to facilitate network traffic routing selection, FIG. 9 is a schematic example wireless environment 900 that can operate in accordance with aspects described herein. In particular, example wireless environment 900 illustrates a set of wireless network macro cells. Three coverage macro cells 902, 904, and 906 include the illustrative wireless environment; however, it is noted that wireless cellular network deployments can encompass any number of macro cells. Coverage macro cells 902, 904, and 906 are illustrated as hexagons; however, coverage cells can adopt other geometries generally dictated by a deployment configuration or floor plan, geographic areas to be covered, and so on. Each macro cell 902, 904, and 906 is sectorized in a 2π/3 configuration in which each macro cell includes three sectors, demarcated with dashed lines in FIG. 9. It is noted that other sectorizations are possible, and aspects or features of the disclosed subject matter can be exploited regardless of type of sectorization. Macro cells 902, 904, and 906 are served respectively through base stations or eNodeBs 908, 910, and 912. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 914, and set of base stations (e.g., eNode B 908, 910, and 912) that serve a set of macro cells; electronic circuitry or components associated with the base stations in the set of base stations; a set of respective wireless links (e.g., links 916, 918, and 920) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 916, 918, and 920 embody a Uu interface (universal mobile telecommunication system Air Interface).

Mobile network platform(s) 914 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 922 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 914 can control and manage base stations 908, 910, and 912 and radio component(s) associated thereof, in disparate macro cells 902, 904, and 906 by way of, for example, a wireless network management component (e.g., radio network controller(s), cellular gateway node(s), etc.). Moreover, wireless network platform(s) can integrate disparate networks (e.g., Wi-Fi network(s), Femto cell network(s), broadband network(s), service network(s), enterprise network(s), and so on). In cellular wireless technologies (e.g., third generation partnership project universal mobile telecommunication system, global system for mobile communication, mobile network platform 914 can be embodied in the service provider network 922.

In addition, wireless backhaul link(s) 924 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 924 embodies IuB interface.

It is noted that while exemplary wireless environment 900 is illustrated for macro cells and macro base stations, aspects, features and advantages of the disclosed subject matter can be implemented in micro cells, pico cells, Femto cells, or the like, wherein base stations are embodied in home-based equipment related to access to a network.

Figure 10:
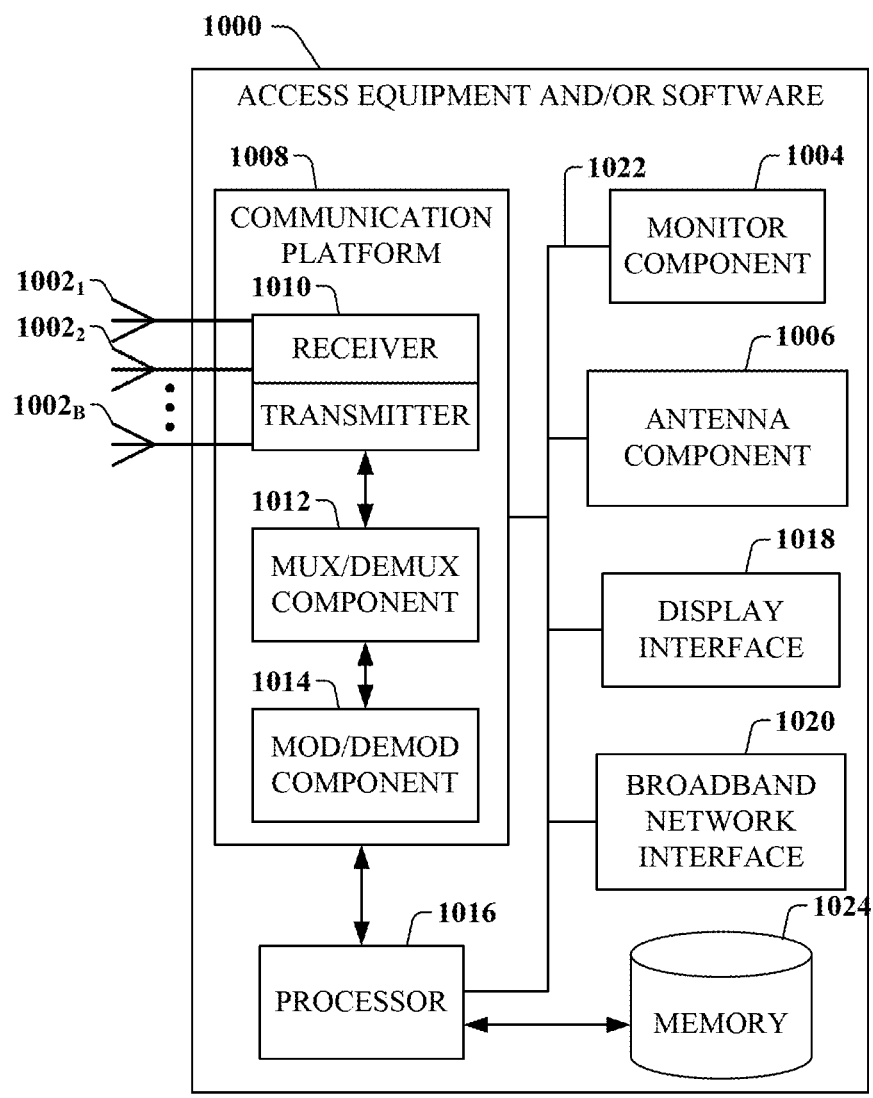
FIG. 10 illustrates a block diagram of access equipment and/or software related to access of a network, in accordance with an embodiment.

To provide further context for various aspects of the disclosed subject matter, FIG. 10 illustrates a block diagram of an embodiment of access equipment and/or software 1000 related to access of a network (e.g., base station, wireless access point, Femtocell access point, and so forth) that can enable and/or exploit features or aspects of the disclosed aspects.

Access equipment and/or software 1000 related to access of a network can receive and transmit signal(s) from and to wireless devices, wireless ports, wireless routers, etc. through segments $1002_1$-$1002_B$ (B is a positive integer). Segments $1002_1$-$1002_B$ can be internal and/or external to access equipment and/or software 1000 related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation, with M a positive integer); phase-shift keying; and so forth).

Access equipment and/or software 1000 related to access of a network also includes a processor 1016 configured to confer, at least in part, functionality to substantially any electronic component in access equipment and/or software 1000. In particular, processor 1016 can facilitate configuration of access equipment and/or software 1000 through, for example, monitor component 1004, antenna component 1006, and one or more components therein. Additionally, access equipment and/or software 1000 can include display interface 1018, which can display functions that control functionality of access equipment and/or software 1000, or reveal operation conditions thereof. In addition, display interface 1018 can include a screen to convey information to an end user. In an aspect, display interface 1018 can be a liquid crystal display, a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software 1000 to receive external commands (e.g., restart operation).

Broadband network interface 1020 facilitates connection of access equipment and/or software 1000 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1020 can be internal or external to access equipment and/or software 1000, and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software 1000, memory 1024 can retain location and/or coverage area (e.g., macro sector, identifier(s)) access list(s) that authorize access to wireless coverage through access equipment and/or software 1000, sector intelligence that can include ranking of coverage areas in the wireless environment of access equipment and/or software 1000, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software 1000.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1024, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 11:
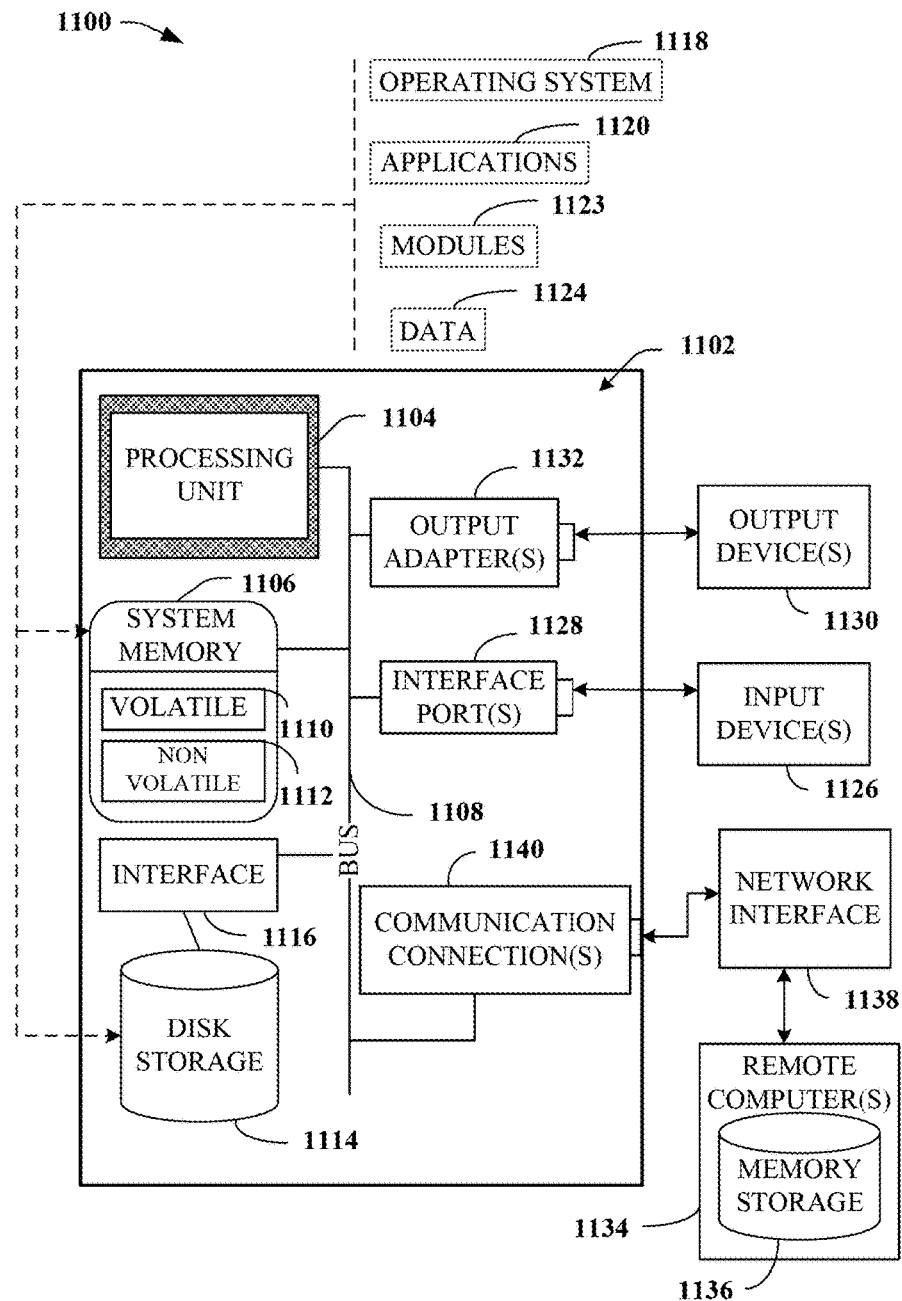
FIG. 11 illustrates a block diagram of a computing system, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that performs particular tasks and/or implement particular abstract data types. For example, in memory (such as at least one memory) there can be software, which can instruct a processor (such as at least one processor 204) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1102 includes a processing unit 1104, a system memory 1106, and a system bus 1108. System bus 1108 couples system components including, but not limited to, system memory 1106 to processing unit 1104. Processing unit 1104 can be any of various available processors. Dual microprocessors and other multiprocessor architectures also can be employed as processing unit 1104.

System bus 1108 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire and small computer systems interface.

System memory 1106 includes volatile memory 1110 and nonvolatile memory 1112. A basic input/output system, containing routines to transfer information between elements within computer 1102, such as during start-up, can be stored in nonvolatile memory 1112. By way of illustration, and not limitation, nonvolatile memory 1112 can include read only memory, programmable read only memory, electrically programmable read only memory, electrically erasable programmable read only memory, or flash memory. Volatile memory 1110 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1102 also includes removable/non-removable, volatile/non-volatile computer storage media. In an implementation, provided is a non-transitory or tangible computer-readable medium storing executable instructions that, in response to execution, cause a system comprising a processor to perform operations. The operations can include comparing a first network congestion condition and a first network parameter condition received from a first set of network devices of a first network, and a second network congestion condition and a second network parameter condition received from a second set of network devices of a second network to a usage parameter and a movement parameter of a mobile device. The operations can also include determining a radio technology (e.g., radio network device) to which to route network traffic of the mobile device. Determining the routing of the network traffic can include, based on a first outcome of the comparing, determining to route the network traffic to the first set of network devices associated with a first radio technology. In another example, determining the routing of the network traffic can include, based on a second outcome of the comparing, determining to route the network traffic of the mobile device to the second set of network devices associated with a second radio technology. In an implementation, determining the set of network devices can include complying with a network selection policy received from a network device that provides a service to the mobile device. Further, the operations can include facilitating routing of the network traffic of the mobile device to the set of network devices.

In an implementation, the operations can include analyzing relative movement of the mobile device with respect to the first set of network devices and the second set of network devices. According to another implementation, the operations can include determining speed data representing a substantially current speed of the mobile device and direction data representing a substantially current direction of the mobile device.

FIG. 11 illustrates, for example, disk storage 1114. Disk storage 1114 includes, but is not limited to, devices such as a magnetic disk drive, floppy disk drive, tape drive, external or internal removable storage drives, super disk drive, flash memory card, or memory stick. In addition, disk storage 1114 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1114 to system bus 1108, a removable or non-removable interface is typically used, such as interface component 1116.

It is to be noted that FIG. 11 describes software that acts as an intermediary between users and computer resources described in suitable operating environment. Such software includes an operating system 1118. Operating system 1118, which can be stored on disk storage 1114, acts to control and allocate resources of computer system 1102. System applications 1120 can take advantage of the management of resources by operating system 1118 through program modules 1122 and program data 1124 stored either in system memory 1106 or on disk storage 1114. It is to be understood that the disclosed subject matter can be implemented with various operating systems or combinations of operating systems.

A user can enter commands or information, for example through interface component 1116, into computer system 1102 through input device(s) 1126. Input devices 1126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1104 through system bus 1108 through interface port(s) 1128. Interface port(s) 1128 include, for example, a serial port, a parallel port, a game port, and a universal serial bus. Output device(s) 1130 use some of the same type of ports as input device(s) 1126.

Thus, for example, a universal serial bus port can be used to provide input to computer 1102 and to output information from computer 1102 to an output device 1130. Output adapter 1132 is provided to illustrate that there are some output devices 1130, such as monitors, speakers, and printers, among other output devices 1130, which use special adapters. Output adapters 1132 include, by way of illustration and not limitation, video and sound cards that provide means of connection between output device 1130 and system bus 1108. It is also noted that other devices and/or systems of devices provide both input and output capabilities such as remote computer(s) 1134.

Computer 1102 can operate in a networked environment using logical connections to one or more remote computers, such as remote computer(s) 1134. Remote computer(s) 1134 can be a personal computer, a server, a router, a network computer, a workstation, a microprocessor based appliance, a peer device, or other common network node and the like, and typically includes many or all of the elements described relative to computer 1102.

For purposes of brevity, only one memory storage device 1136 is illustrated with remote computer(s) 1134. Remote computer(s) 1134 is logically connected to computer 1102 through a network interface 1138 and then physically connected through communication connection 1140. Network interface 1138 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1140 refer(s) to hardware/software employed to connect network interface 1138 to system bus 1108. While communication connection 1140 is shown for illustrative clarity inside computer 1102, it can also be external to computer 1102. The hardware/software for connection to network interface 1138 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project LTE, third generation partnership project 2 ultra-mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, LTE advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
   in response to receiving a communication indicating a failure to establish a first network connection with a network device of a communication network,
   detecting, by a system comprising a processor, a number of network connections with which the network device is operable to establish with network devices of the communication network, wherein the detecting the number of network connections comprises detecting a first number of network connections with which the network device is operable to establish with macro cell network devices and detecting a second number of network connections with which the network device is operable to establish with micro cell network devices,
   determining, by the system, a first number of network devices with which the network device is operable to establish at least a portion of the number of network connections,
   determining, by the system, a second number of network devices that is less than the first number of network devices, and
   facilitating, by the system, a second network connection for the network device based on the second number of network devices.

2. The method of claim 1, wherein the determining the first number of network devices comprises determining a number of micro cell network devices with which the network device is operable to establish the number of network connections.

3. The method of claim 1, wherein the determining the first number of network devices comprises determining a number of macro cell network devices with which the network device is operable to establish the number of network connections.

4. The method of claim 1, further comprising:
   determining, by the system, a number of connection attempts to the network devices; and
   disconnecting, by the system, a third network connection for the network device based on the number of connection attempts.

5. The method of claim 1, further comprising:
   determining, by the system, a rate of connection attempts to the network devices; and
   disconnecting, by the system, a third network connection for the network device based on the rate of connection attempts.

6. The method of claim 1, further comprising:
   determining, by the system, a rate of connection attempts to the network devices; and
   ranking, by the system, the network devices based on the rate of connection attempts.

7. The method of claim 1, further comprising:
   modifying, by the system, the second number of network devices in response to a determination that a status of a third network connection for the network device is altered.

8. The method of claim 1, further comprising:
   determining, by the system, a rate of connection attempts to the network devices; and
   initiating, by the system, an action based on the rate of connection attempts.

9. A system, comprising:
   a processor; and
   a memory that stores executable instructions that, when executed by the processor, facilitate performance of operations, comprising:
   generating network device data indicative of information for a group of network devices communicatively coupled to a first network device; and
   in response to detecting a trigger event indicating a failure of the first network device to establish a network connection with a second network device:

determining a number of network connections associated with the first network device based on the network device data, wherein the determining the number of network connections comprises determining a first number of network connections associated with a group of macro cell network devices and determining a second number of network connections associated with a group of micro cell network devices, determining a number of network devices with which the first network device is able to establish the number of network connections, and maintaining, for a network connection handover associated with the first network device, a defined number of network devices that is less than the number of network devices.

10. The system of claim 9, wherein the determining the number of network devices comprises determining a first number of network devices associated with a first type of network device and determining a second number of network devices associated with a second type of network device.

11. The system of claim 9, wherein the maintaining the defined number of network devices comprises facilitating the network connection with a third network device associated with the defined number of network devices.

12. The system of claim 9, wherein the maintaining the defined number of network devices comprises generating a ranking of network devices from the group of network devices based on a rate of connection attempts to the group of network devices.

13. The system of claim 9, wherein the maintaining the defined number of network devices comprises modifying the defined number of network devices in response to a determination that a third network device associated with the defined number of network devices is disconnected from the first network device.

14. The system of claim 9, wherein the maintaining the defined number of network devices comprises modifying the defined number of network devices in response to a determination that a condition with respect to a third network device has been satisfied.

15. A non-transitory computer-readable medium comprising executable instructions that, when executed by a processor, facilitate performance of operations, comprising:

generating neighbor device data indicative of information for network devices in a communication network; and in response to receiving a communication indicative of a failure to establish a first network connection with a network device of the communication network, determining a number of network connections with which the network device is capable of establishing with the network devices in the communication network, wherein the determining the number of network connections comprises determining a first number of network connections associated with a first type of network device and determining a second number of network connections associated with a second type of network device, determining a first number of network devices associated with the number of network connections, determining a second number of network devices that is less than the first number of network devices based on the neighbor device data, and establishing a second network connection for the network device based on the second number of network devices.

16. The non-transitory computer-readable medium of claim 15, wherein the determining the first number of network devices comprises determining a number of micro cell network devices associated with the number of network connections.

17. The non-transitory computer-readable medium of claim 15, wherein the determining the first number of network devices comprises determining a number of macro cell network devices associated with the number of network connections.

18. The non-transitory computer-readable medium of claim 15, wherein the operations further comprise:

updating the neighbor device data based on a rate of connection attempts to the network devices.

19. The non-transitory computer-readable storage medium of claim 15, wherein the operations further comprise:

updating the second number of network devices based on a rate of connection attempts to the network devices.

20. The non-transitory computer-readable medium of claim 15, wherein the operations further comprise:

facilitating an action based on a rate of connection attempts to the network devices being determined to satisfy a criterion.

* * * * *